US009003447B2

United States Patent
Harboe et al.

(10) Patent No.: US 9,003,447 B2
(45) Date of Patent: Apr. 7, 2015

(54) SYSTEM AND METHOD FOR CUSTOMIZING COMMUNICATION IN A SOCIAL TELEVISION FRAMEWORK

(75) Inventors: Gunnar Harboe, Evanston, IL (US); Noel Massey, Carpentersville, IL (US); Von A. Mock, Boynton Beach, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 1221 days.

(21) Appl. No.: 12/347,620

(22) Filed: Dec. 31, 2008

(65) Prior Publication Data

US 2010/0169917 A1 Jul. 1, 2010

(51) Int. Cl.
| | |
|---|---|
| G06F 3/00 | (2006.01) |
| G06F 13/00 | (2006.01) |
| H04N 5/445 | (2011.01) |
| H04N 7/173 | (2011.01) |
| H04N 7/15 | (2006.01) |
| H04N 21/258 | (2011.01) |
| H04N 21/422 | (2011.01) |
| H04N 21/4223 | (2011.01) |
| H04N 21/4788 | (2011.01) |

(52) U.S. Cl.
CPC ............. *H04N 7/173* (2013.01); *H04N 7/15* (2013.01); *H04N 21/25883* (2013.01); *H04N 21/25891* (2013.01); *H04N 21/42203* (2013.01); *H04N 21/4223* (2013.01); *H04N 21/4788* (2013.01)

(58) Field of Classification Search
USPC .............................................. 725/46, 48, 91
See application file for complete search history.

(56) References Cited

U.S. PATENT DOCUMENTS

| | | | | |
|---|---|---|---|---|
| 5,481,542 | A * | 1/1996 | Logston et al. | 725/131 |
| 6,912,505 | B2 | 6/2005 | Linden et al. | |
| 7,143,428 | B1 * | 11/2006 | Bruck et al. | 725/37 |
| 7,603,683 | B2 * | 10/2009 | Reto | 725/34 |
| 7,810,123 | B1 * | 10/2010 | Prestoy | 725/91 |
| 7,895,625 | B1 * | 2/2011 | Bryan et al. | 725/46 |
| 8,015,249 | B2 * | 9/2011 | Nayak et al. | 709/206 |
| 8,549,575 | B2 * | 10/2013 | Amento et al. | 725/116 |
| 8,577,983 | B2 * | 11/2013 | deCarmo | 709/207 |
| 8,752,086 | B2 * | 6/2014 | Conant | 725/34 |

(Continued)

FOREIGN PATENT DOCUMENTS

| | | |
|---|---|---|
| EP | 1357754 A1 | 10/2003 |
| EP | 1954051 A1 | 8/2008 |

(Continued)

OTHER PUBLICATIONS

Jorge Abreu et al.; "2BeOn—Interactive Television Supporting Interpersonal Communication"; Proceedings of the Eurographics Workshop on Multimedia; Jan. 1, 2002; pp. 199-208; XP002278091.

(Continued)

*Primary Examiner* — Brian T Pendleton
*Assistant Examiner* — Jonathan V Lewis
(74) *Attorney, Agent, or Firm* — Lowenstein Sandler LLP

(57) ABSTRACT

A system and method for customizing communication in a social television framework is described. The method includes retrieving a current context data set corresponding to multiple users, wherein the current context data set includes a user profile component and a media content component. A customized mark set is determined based on an analysis of the current context data set, and at least one of the marks in the customized mark set is sent to a client end device to be experienced by at least one of the users.

17 Claims, 2 Drawing Sheets

(56) References Cited

U.S. PATENT DOCUMENTS

| | | | |
|---|---|---|---|
| 8,856,833 B2* | 10/2014 | Conness et al. | 725/46 |
| 2002/0199194 A1* | 12/2002 | Ali | 725/46 |
| 2004/0010808 A1* | 1/2004 | deCarmo | 725/139 |
| 2005/0171799 A1* | 8/2005 | Hull et al. | 705/1 |
| 2006/0143068 A1* | 6/2006 | Calabria | 705/10 |
| 2006/0178975 A1 | 8/2006 | Jung et al. | |
| 2006/0247055 A1* | 11/2006 | O'Kelley et al. | 463/42 |
| 2006/0271997 A1* | 11/2006 | Jacoby et al. | 725/135 |
| 2007/0028266 A1* | 2/2007 | Trajkovic et al. | 725/46 |
| 2007/0271586 A1* | 11/2007 | Alperin | 725/109 |
| 2009/0064230 A1* | 3/2009 | Hung | 725/47 |
| 2009/0133070 A1* | 5/2009 | Hamano et al. | 725/46 |
| 2009/0271820 A1* | 10/2009 | Choi et al. | 725/37 |

FOREIGN PATENT DOCUMENTS

| | | |
|---|---|---|
| WO | 0009978 A2 | 7/2000 |
| WO | 03030547 A1 | 4/2003 |
| WO | 2006095319 A1 | 9/2006 |

OTHER PUBLICATIONS

Patent Cooperation Treaty; "Notification of Transmittal of the International Search Report and the Written Opinion of the International Searching Authority, or the Declaration" for International Application No. PCT/US2009/067266; Apr. 9, 2010; pp. 1-13.

* cited by examiner

SYSTEM AND METHOD FOR CUSTOMIZING COMMUNICATION IN A SOCIAL TELEVISION FRAMEWORK

FIELD OF THE INVENTION

The present invention relates to shared media frameworks such as social television and, more particularly, to systems and methods for providing customized marks in a social television framework.

BACKGROUND OF THE INVENTION

There is increasing convergence between media consumption and social networking/communication schemes, resulting in various types of shared media experiences such as social television. A social television framework allows one or more participants at each of two or more different locations who are watching television to communicate with one another via a communication system that can be integrated with the television equipment. A typical communication system allows for various social groups to be defined and can provide information of interest to participants on respective television screens. This information can include who else in a defined group is watching television, what channels and programs the others are watching, program suggestions, and historical information such as viewing habits. The communication system facilitates communication between these participants, where the communication can be in the form of text messages, emoticons, voice communication, or (less commonly) video conferencing.

For example, a buddy list of a participant can be displayed on a portion of that participant's television screen which lists other members in one or more defined groups of that participant and indicates whether each member is currently watching television (presence) and what program is being watched (content). Pre-defined communication options can be made available to the participants, including for example a set of standard text messages, or a set of graphical emoticons such as an "exclamation mark smiley", a "thumbs up smiley", and a "thumbs down smiley". These can provide a simple way to comment on the program or exchange greetings between group members without necessarily getting engaged in further conversations.

Further, a text chat feature similar to instant messaging (IM) can be provided. In this case, a participant can select, via a user interface, a buddy from the buddy list (the buddy must be active, but can be watching a different channel), then type and send a message. The message then appears on a portion of the buddy's television screen in a chat window, thus initiating a conversation. The chat window can easily be hidden so as not to obstruct the television program. Participants can be in multiple text chats at the same time and switch between them.

Voice communication can also be supported through the use of microphones and the establishment of audio links between participants at different locations. For example, echo-cancelling microphones can be placed at a convenient location such as on a coffee table in front of the television. A participant can select a buddy from the buddy list and call him or her. If the buddy accepts the incoming call, an audio link is set up and the call starts directly. The voice of a remote participant is transmitted through the television speakers, mixed in with the audio from the television program. Typically, the microphone sensitivity and the volumes of the voices and the television program audio can be muted and adjusted independently. Group calls are also possible. A call can be set up with multiple people from the start, or more people can be invited to join an ongoing call. There is no particular ownership of a call; any participant can invite more people to join, and the call lasts for as long as any two participants remain. Typically, it is only possible to join a call by invitation, and each participant can only be in one call at a time. When in a voice conversation, or when invited to a voice call, a list of all the current participants in the call is provided.

Participants can start and maintain voice conversations with their buddies whether or not they are watching the same TV station or program. It is also possible to take part in both a voice and a text conversation simultaneously, either with the same participants (e.g., using text as a backchannel in a voice conversation), or in different conversations with different people.

Thus a typical communication system in a social television framework facilitates interactions between participants who can be remote from each other. There are, however, opportunities to develop an improved communication system in a social television framework.

DETAILED DESCRIPTION

The present invention provides a communication system and method for customizing communications by providing customized marks to users in a social television framework. In some embodiments, customized marks are provided to users who are members of predefined social groups. The communication system is operable to retrieve and evaluate current context data corresponding to multiple users at different television viewing locations. The current context data includes information corresponding to the television watchers including user profile information and the content of what they are currently watching.

The user profile information includes information specific to the users, such as what group or groups they are members of, personal information, and preferences such as interests, hobbies, and favorites, like favorite sports teams. The content information can include the name of the program being watched, the channel, genre, program sponsor, or specific actual program content. The communication system determines one or more one customized marks based on an analysis of this information. The determined customized marks can take various forms, such as audio, images, text, video, emoticons, haptic experiences, or the like. The communication system sends one or more of these customized marks to be experienced by at least one of the users. In this manner, customized interactions between users of the communication system are facilitated.

For a general flavor of the types of customized marks that can be provided to enhance the social aspect of the shared television experience, the following examples are offered. Members of a predefined group of college buddies who are watching Monday night football can be provided with football-related icons or avatars to be displayed as part of an instant messaging function, and the group can be identified with a specific audio cheer such as "First and Ten Do it again ... Go Team Go", or a specific football related logo such as an NFL team logo. During the game, different sets of graphic images can be provided based on what is happening in the game, such as when a team scores, is penalized, or other noteworthy events.

In other scenarios, which can be also be enabled by this communication system and method, a group of home improvement fans can be identified by the sound of a jackhammer or a saw during interactions. Chicago Cubs fans who are watching a Cubs baseball game can be provided with the sound of a can of beer being opened when a group member becomes active. Fans of a cooking channel can be provided with sounds related to food preparations, or a suggestion to join others in a Dinner Club group. Users watching a horror flick can be provided with a set of predefined emoticons such as a screamer, a fainter, etc. Such customized marks provide a richer television viewing experience through interactions with friends (or groups of friends) who are also currently watching television.

Figure 1:
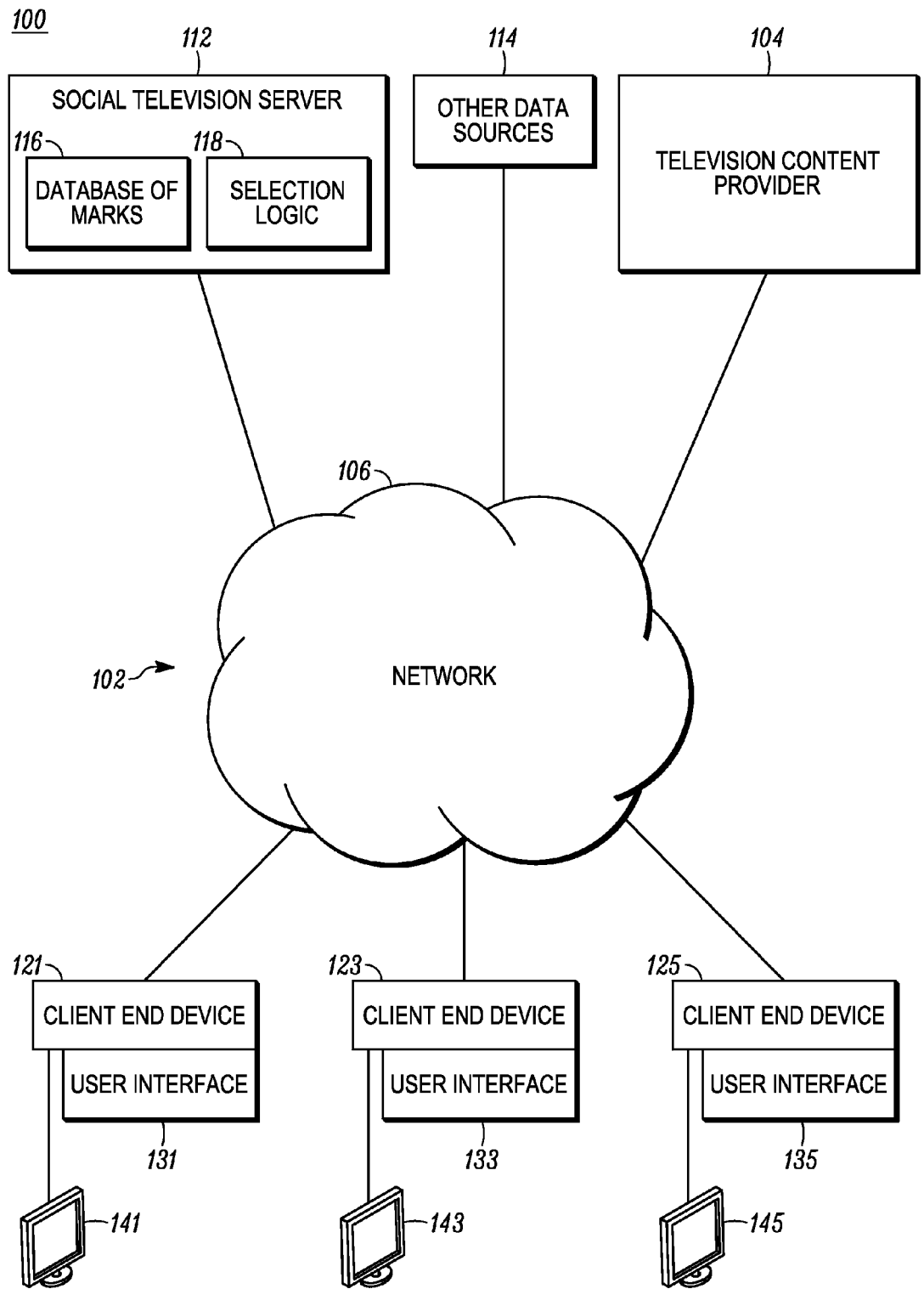
FIG. 1 is a block diagram of a social television framework including a communication system in accordance with at least some embodiments of the invention.

Referring more particularly to FIG. 1, an exemplary social television framework 100 is shown in a simplified schematic form including a communication system 102 in accordance with at least some embodiments of the present invention. As shown, the social television framework 100 includes a television content provider 104, such as a cable or a satellite television provider, which provides content in the form of television signals corresponding to a plurality of channels. The television signals are distributed via a network 106, such as a cable network or a satellite network, to be received by each of a plurality of client end devices 121, 123, 125, which can take the form of a set-top box. Each of the client end devices 121, 123, 125 operates to convert the television signals to a format for viewing on a corresponding television screen 141, 143, 145, and is typically situated near its corresponding television. The various television screens 141, 143, 145 are situated at different locations and each is under the control of a corresponding user.

The communication system 102 allows for communication between active users (i.e., those watching television) and includes a social television server 112 that is in electronic communication, via the same network 106 or a different one, with each of the plurality of client end devices 121, 123, 125. The social television server 112 can also be in communication with the content provider 104, as well as with one or more other data sources 114, again via the same network 106 or a different one. Generally speaking, a content provider 104 provides program guide information such as the channels available from the content provider, the programs available on each channel and their times of availability, at least one genre classification for each program, and a short logo and/or synopsis of each program. Other data sources can augment the program guide with program sponsor or sponsors, real-time program content which can be provided via closed caption information or RSS (Really Simple Syndication) feeds, or the like. The social television server 112 can be a component of an entity separate from the television content provider 104, or can be combined with the content provider in the form of a Multiple System Operator (not shown).

The social television server 112 includes one or more processors and one or more databases (not specifically shown) and is operable to facilitate communication between users and to perform other various functions as described below. The databases store information regarding the various television users in the form of a plurality of user profiles, each user profile associated with a respective user. In particular, each user profile includes information specific to that user such as group membership information (which includes one or more contact or buddy lists), name, username, age, gender, relationships, residence, and various preferences relating to interests, hobbies, and favorites. The user profile information can also include other factors relating to current, past, or anticipated user behavior, such as historical viewing data, text or audio interactions with others, and stored program reminders.

Further, the social television server 112 includes (or can access) a database 116 storing a plurality of marks which can be arranged as multiple sets of marks, each set relating to a particular category ranging from general to very specific. These sets can be representative of categories such as sports, baseball, college basketball, Cubs baseball, political shows, travel shows, cooking shows, and many others. The multiple sets of marks each include entries of expressive items relating to its category and can include a predetermined number of customized entries which correspond to "equivalent" marks in a standard set. For example, the standard set of marks can include a "thumbs up" graphic and a "thumbs down" graphic, among others. A customized mark set relating to a specific category such as Cubs baseball can then include a Cubs logo incorporated as part of a customized "thumbs up" graphic and a customized "thumbs down" graphic.

The social television server 112 also includes (or can access) a selection logic program 118 which is operable to determine at least one customized mark or set of marks from the database 116 to customize communications between users.

The communication system 102 can support various forms of communication between users, such as pre-defined text messages, graphical emoticons, voice communication, and text chat. Each of the client end devices 121, 123, 125 includes a respective user interface 131, 133, 135 for allowing a respective user to input various commands, selections, text, or other inputs to control a corresponding client end device 121, 123, 125 and to initiate and implement interactions with other users. Generally, a user interface 131, 133, 135 is in the form of a television remote control. Other auxiliary devices (not shown) can also be provided to enable these various forms of communication and are considered part of the user interface 131, 133, 135. For example, a user interface 131, 133, 135 can include a wireless keyboard for text communication and/or a microphone for voice communication.

One example of communication between users which can be supported by the communication system 102 is instant messaging (IM), which can be based on the IM-chat protocol XMPP (Extensible Messaging and Presence Protocol) and include the following steps:

1. One of the client end devices (e.g. 121), under the control of a user, establishes a connection with the social television server 112.
2. The server 112 sends to the client end device 121 the current status of all the contacts associated with that user (the contacts of each user are stored as part of the user profile and is often represented in the form of a "buddy list"), and this information can be displayed on the television screen 141 of the user.
3. The client end device 121 sends the server 112 its current status including, among other things, the channel and program that is being watched by that user.
4. The server 112 broadcasts this information to all the user's contacts who are currently connected (active status), and keeps track of status of these contacts via their associated client end devices (e.g., 123, 125).
5. Whenever there is a change in status corresponding to one of the client end devices 121, 123, 125, such as a change in what program is being watched or a change from active or inactive status, the affected client end device sends an update to the server 112, and the server 112 distributes this information to the others. Thus, users can track the social television status of their buddies.

6. When a user wants to communicate with another user on the contact list, the user selects a buddy from the displayed contact list using the user interface 131 and enters a message (e.g., a text message, an icon, or a voice message), the associated client end device (e.g. 121) sends the server 112 a message addressed to the buddy, and the server 112 relays it to the appropriate client end device. The buddy can respond in the same manner.

Figure 2:
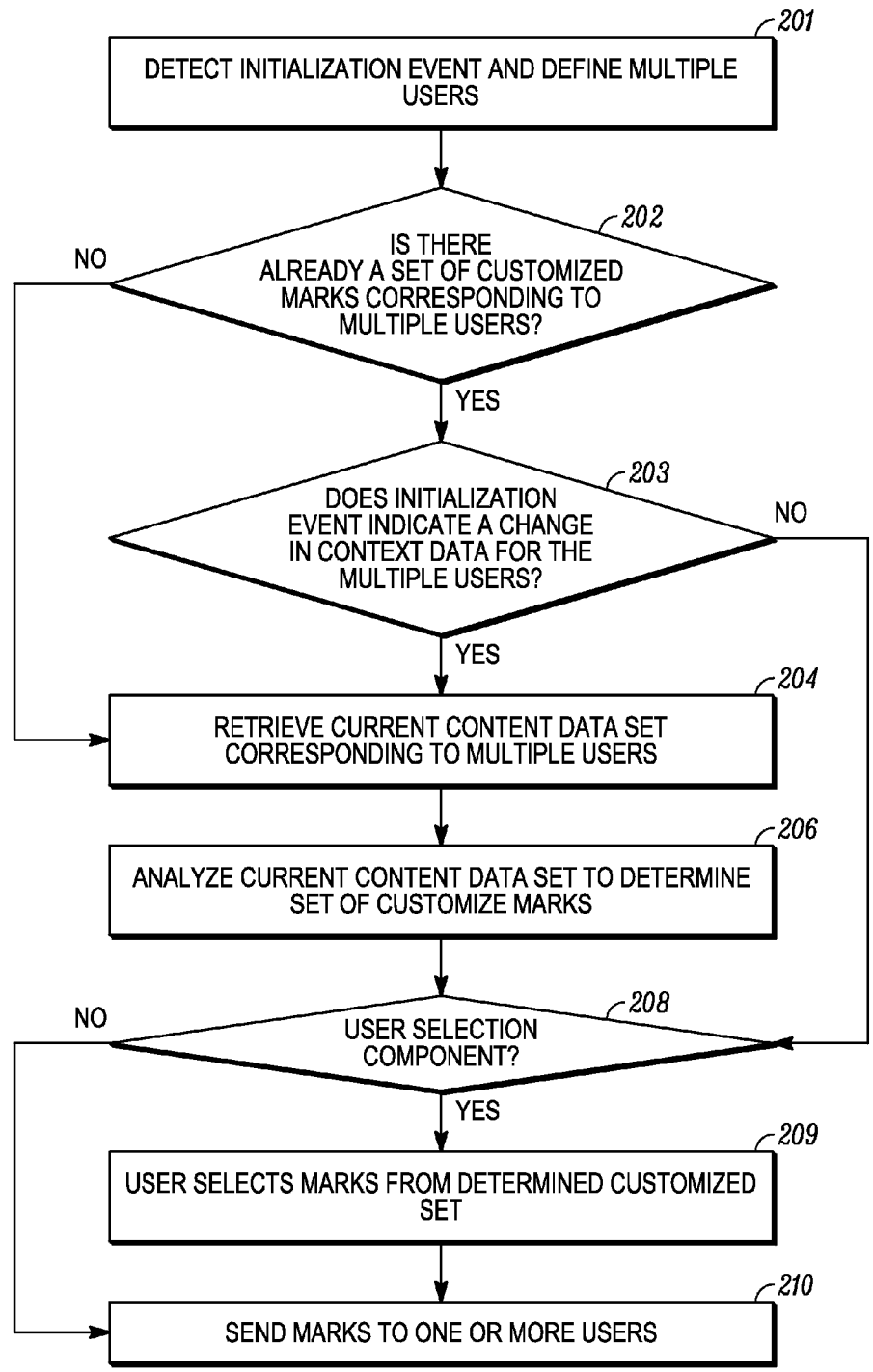
FIG. 2 is a flow chart of an exemplary method for providing customized marks to users in a social television framework in accordance with at least some aspects of the invention.

Referring to FIG. 2, an exemplary general method 200 for customizing communications by providing customized marks to one or more users is illustrated, in accordance with at least some aspects of the invention. This method expands on the standard IM-chat protocol described above. In particular, the method begins at step 201, at which an initialization event is detected by the server 112. Various initialization events can be defined which will trigger further action. For example, one defined initialization event can be a user indicating a desire to send a message to another user by selecting a buddy from a contact list. Another defined initialization event can be a notification of a pending program such as a live sporting event or a specific program regularly watched by one or more users. A further defined initialization event can be a defined change in status (such as inactive to active status) of a user of a defined group, when one or more other members of the group are already active or are scheduled to become active. Another defined initialization even can be based on events occurring in a television program as noted by the television content provider 104 or other data sources 114.

Further at step 201, the multiple users are defined, for example, as a main user and one or more buddies, or as a defined group. The identity of the multiple users can be determined by the type of initialization event detected. For example, the identified multiple users can include a desired sender of a message and a desired recipient of the message, both of whom are actively watching television. As another example, the identified multiple users can be members of a predefined group, such as a Monday Night Football watchers group, determined by a stored program reminder of a Monday Night Football program corresponding to one or more of the members. After a defined initialization event is detected and the multiple users are defined, processing then proceeds to step 202.

At step 202, it is determined whether a set of customized marks corresponding to the multiple users already exists. If so, processing proceeds to step 203. If not, processing proceeds to step 204.

At step 204, a current context data set corresponding to the multiple users is retrieved by the server 112. A current context data set includes a user profile component (relating to the user profiles of the multiple users) and a media content component. Thus, the server 112 accesses the appropriate stored user profiles to retrieve information corresponding to the user profile component. Further, the server 112 obtains information regarding the media content component from the appropriate client end devices 121, 123, 125, and/or from communication with the television content provider 104, and/or from the other data sources 114. The content information can include the name of the program being watched, the channel, genre, program sponsor or sponsors, or actual program content which can be provided via closed caption information or RSS (Really Simple Syndication) feeds or the like. The specific items of the user profile component and the media content component to be retrieved and subsequently analyzed can vary depending on factors such as group membership or group type.

After the current context data set is retrieved, processing proceeds to step 206. At step 206, the current context data set is analyzed to determine a set of customized marks (which can include as few as a single mark), according to the available marks in the database of marks 116 and a selection logic 118 program that can be executed by the server 112. A simple version of the selection logic 118 entails assigning different possible states of the data components making up the current context data set to one or more sets or types of marks, with a weighing or priority value assigned to these states as well, adding up values for each set of marks to produce a total, and then selecting a set of marks with the highest total. Different (including both simpler and more complicated) rules for selecting a set of marks from the stored marks in the database can also be used.

For example, assume Alice and Bob are both actively watching television at different locations and using the communication system. They are both members of a cooking group, they are dating each other, and they are currently both watching NFL football on ESPN, with the Falcons playing the Bears. Alice is a Falcons fan, and Bob is a Bears fan, and the game is sponsored by Coca-Cola. Some of these factors can be loaded explicitly into the social television server 112 via the client end device 121, 123, 125 by an individual user (e.g., the dating relationship between Alice and Bob, the preferred sports teams of each viewer, and each user's cooking group membership), some factors can be loaded into the server 112 by others (e.g., the cooking group coordinator can load in the membership of each member-user), some factors can be identified through the client end devices 121, 123, 125 or the television content provider 104 (e.g., the current television program being viewed, the preferred sports teams of each viewer based on viewing history, an interest in cooking based on viewing history), and some factors can be identified through other data sources 114 (e.g., the Coca-Cola sponsorship of the currently-viewed game, the current geographic address of the user as being potentially indicative of a preferred sports team).

All of these factors can be included in the current context data sets, and these different factors would each tend to give priority to a respective particular set of marks from the database of marks 116. Their group membership would assign priority to a cooking-related set of marks, and their relationship can assign priority to a romance-related set of marks. The channel and program would assign priority to a general set of sports marks, and to ESPN, football, NFL, Falcons, and Bears sets of marks specifically. The profiles for Alice and Bob would tend to give priority to Falcons-related marks for Alice and Bears-related marks for Bob. The program sponsor information could give priority to Coca-Cola marks. Particular events in the game (gathered from separate event streams provided by the other data sources 114) could assign high priority to very specific sets (like a Touchdown! Set, for example) for a defined time period following the particular event. In this particular context, depending on the sets of stored marks and the weighting of the different factors, the set of marks picked by the selection logic would likely be football and sports related.

After the set of customized marks is determined, processing proceeds to step 208. At step 208, the server 112 determines whether the desired communication includes a user selection component. If not, then processing proceeds to step 210. If so, then processing proceeds to step 209, at which the user selects a desired mark from the set of customized marks, and then processing proceeds to step 210. At step 210, at least one server-selected or user-selected mark is sent to at least one of the users. In the case of visual marks, these can then be displayed on the television screen of one or more of the users.

As long as the current context data is accurate, the set of customized marks does not need to be re-determined. In other words, if the detected 201 initialization event is another message from Alice to Bob and the context data is unchanged, the steps of retrieving 204 current context data and determining 206 of a set of customized marks can be skipped. Thus, at step 203, it is determined whether the context data is changed. If so, then processing proceeds to step 204. If not, then processing proceeds to step 208. For example, further messages with customized marks can be sent from Alice to Bob during the football game based on the same set of customized marks. If the context data changes, as detected through step 201, the server 112 may retrieve the current context data and re-assess the set of customized marks. For example, if the Falcons get a field goal, an additional mark showing a Falcons logo through goal posts may be available in the set of customized marks for a period of time following the field goal.

Various scenarios are possible which fall under the general method described above. For example, a user can press a control on the associated user interface (e.g. 131) to send a general type of message to another user, such as a "thumbs up" or a "thumbs down" message. Continuing the detailed example, Alice can select Bob from her buddy list and press the "thumbs up" button on her remote controller user interface 131. The specific appearance of the message depends on the current context data set, and the server selection logic 118 program determines a set of customized marks from the database of marks 116 based on an analysis of the current context data set. In this situation, the server 112 selects a mark with a Falcons logo squashing a Bears logo to represent the "thumbs up" message from a customized set of marks including a Falcons logo, a Falcons logo squashing a Bears logo, a Coca-Cola can, a carrot, and a heart. The server 112 sends a message to the desired recipient, including the selected mark (selected by the server) and optionally sends an "echo" of the message back to the sender. The selected mark is displayed by the recipient and the "echo" can be displayed by the sender.

In some cases, it is also possible for a user to "veto" a server selected mark. For example, if Alice didn't want to send the Falcons-squash-Bears mark in the future (at least for the rest of the television program), she can send a message to the server asking to delete that mark from the set of customized marks. Conversely, if she liked that mark, she can indicate her preference of that mark to the server.

In another example, a sender wants to control the specific appearance of the message and informs the server 112 of the intended recipient(s). The server 112, after determining a set of marks as described above in step 206, determines in step 208 that there is a user selection component and sends the list of selected marks to the sender's client end device 131, and this list is displayed on the sender's television screen 141. In this situation, Alice can select directly from a customized set of marks including a Falcons logo, a Falcons logo squashing a Bears logo, a Coca-Cola can, a carrot, or a heart. The sender picks a mark from the list, and the sender's client end device sends a message to the server, indicating the specific mark picked and the desired recipient. The server 112 sends a message to the recipient, including the selected mark, and also can send an "echo" of the message back to the sender.

In a further example, an event happens on a client end device 121 which causes a notification that uses a customized mark. Such an event can be a timed reminder of a scheduled program to be viewed. In this situation, Alice's client end device 121 may be programmed to remind her that America's Test Kitchen will be airing in 10 minutes on PBS, and this reminder will appear on her television screen 141 while she is watching the Falcons v. Bears game on ESPN. In this case, the client end device 121 sends a message to the server 112, requesting a type of mark related to the event. The server selection logic determines a set of customized marks based on a current context data set. The server 112 sends a message back to the client end device 121 with the set of customized marks determined by the selection logic, which set is of a type related to the event. The client end device 121 controls the display of the customized mark on the television as a notification of the event. For example, the customized set of marks could still include a Falcons logo, a Falcons logo squashing a Bears logo, a Coca-Cola can, a carrot, or a heart, but in this situation the server 112 selects a carrot as a logo to accompany the explicit text message "America's Test Kitchen starting in 10 minutes on PBS (cable channel 120)."

In another example, an event occurs which is noted on the server side that causes a notification that uses a customized mark, such as when one of a user's buddies (using client end device 125) becomes active in the social television framework. The event is linked with a type of mark. The server selection logic determines a set of customized marks based on the current context data set per step 206, which now specifically includes the joining of a particular buddy. The server 112 sends the client end device 131 of the user a message notifying it of the event, using a selected one of the set of customized marks determined by the selection logic to be associated with the event. The client end device 131 of the user controls the display or experience of the mark as a notification of the event, such as by displaying a graphic mark on the television. For example: Charles is a cooking group member and he turns on his television and tunes it to PBS. Alice and Bob, who are watching television on their respective screens 141, 143 receive a message "Charles is watching PBS" accompanied by a carrot graphic selected by the server 112 from the set of customized marks, which has been customized based on the current context data of Alice, Bob, and Charles. Conversely, Charles's buddy list may be displayed on this television screen 145 with a Falcon icon beside Alice's name and a Bears icon beside Bob's name. When Alice changes the channel to PBS to watch America's Test Kitchen, the icon beside Alice's name changes to a carrot.

Although the above described and illustrated communication system 102 includes a client-server arrangement with much of the processing and storage functionality at the server 112, it is to be understood this functionality can also be undertaken at each client end device 121, or it can be a distributed processing system with processing distributed between the client end devices and the server in a known manner.

In view of the above discussion, it should be apparent that the communication system and method described provide customized marks to enable expression of social identity and enhance the experience of social television.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method for customizing communication in a social television framework, the method comprising:
retrieving, by a social television server, a current context data set corresponding to multiple users, wherein the current context data set includes a user profile component and a media content component, determining, by the social television server, a customized mark set based on an analysis of the current context data set, wherein the customized mark set includes a plurality of marks, and wherein each of the marks is assigned a respective priority reflective of a relationship shared by a respective group of two or more of the multiple users, receiving, by the social television server, an indication of a user selection from a first of the multiple users of at least one of the marks in the customized mark set to be sent to at least one of the multiple users; and sending, by the social television server, the at least one of the marks in the customized mark set to at least one of the multiple users.

2. The method of claim 1, wherein the customized mark set is determined from a plurality of marks stored in a database.

3. The method of claim 1, wherein the retrieving step is triggered by a predetermined initialization event.

4. The method of claim 3, wherein the initialization event is an activity performed by a user device of one of the multiple users.

5. The method of claim 4, wherein the activity includes at least one of: changing from an inactive to an active status in the social television framework or an indication of a desire to send a message to another user.

6. The method of claim 3, wherein the initialization event is triggered by monitoring a start time of a predefined program.

7. The method of claim 1, wherein the user profile component comprises at least one of: group membership data, name, age, gender, residence, relationships, or television program preferences.

8. The method of claim 1, wherein the user profile component comprises data relating to user behavior comprising at least one of: historical viewing data, interactions with other users, or stored television program reminders.

9. The method of claim 1, wherein the media content component comprises data relating to at least one of: a program name, a genre, a channel, actual program content, or a program sponsor.

10. The method of claim 1, wherein the customized mark comprises at least one of: an audio, an image, a text, a color, a video, or a haptic experience.

11. A communication system for customizing communication between users in a social television framework, the system comprising:
a plurality of client devices each connected to a corresponding television screen and in communication with a television content provider for receiving television signals therefrom for display on the corresponding television screen,
a server in communication with the plurality of client devices, the server operating to facilitate message exchange between multiple users of the client devices, and
wherein the server has access to user profile information and media content information corresponding to each of multiple users and access to a plurality of marks, and the server (a) operates to retrieve a current context data set corresponding to the multiple users, which current context data set includes a user profile component and a media content component, (b) operates to determine a customized mark set based on an analysis of the current context data set, wherein the customized mark set includes a plurality of marks, and wherein each of the marks is assigned a respective priority reflective at least in part of an interest or relationship shared by a respective group of two or more of the multiple users, (c) operates to receive from a first of the multiple users an indication of a user selection of at least one of the marks in the customized mark set to be sent to at least one of the multiple users, (d) operates to send the at least one of the marks in the customized mark set to at least one of the multiple users other than the first user via a respective one of the plurality of client end devices, and one or both of (e1) operates to additionally send an echo message back to the first user or (e2) operates to receive from the first user a command to delete the at least one mark, wherein the respective priority assigned to each of the marks is reflective at least in part of the relationship.

12. The communication system of claim 11, wherein the server includes a database for storing the plurality of marks.

13. The communication system of claim 11, wherein the server includes a database for storing user profile information.

14. The communication system of claim 11, wherein the server is in communication with the television content provider for accessing media content information.

15. The communication system of claim 11, wherein the server is in communication with the plurality of client devices via a network.

16. An apparatus in communication with a plurality of client end devices, each client end device associated with a respective user, connected to a corresponding television, and in communication with a television content provider for receiving television signals therefrom for display on a corresponding television screen, the apparatus for customizing communication between users in a social television framework, the apparatus comprising:
a server including a database for storing user profile information corresponding to each of multiple users of the client end devices, and operating to facilitate message exchange between the multiple users, and
wherein the server includes a database for storing a plurality of marks, (a) operates to retrieve a current context data set corresponding to multiple users, which current context data set includes a user profile component and a media content component, (b) operates to determine a customized mark set based on an analysis of the current context data set, wherein the customized mark set includes a plurality of marks, and wherein each of the marks is assigned a respective priority reflective at least in part of an interest or relationship shared by a respective group of two or more of the multiple users, (c) operates to receive from a first of the multiple users an indication of a user selection of at least one of the marks in the customized mark set to be sent to at least one of the multiple users, and (d) operates to send the at least one of the marks in the customized mark set to the at least one of the multiple users via one of the plurality of client devices, wherein the respective priority assigned to each of the marks is reflective at least in part of the relationship.

17. The method of claim 1, wherein each of the marks is assigned a respective priority that is also reflective at least in part of an interest.

* * * * *